J. T. TURNER.
MACHINE FOR MAKING ICE CREAM CONES.
APPLICATION FILED FEB. 28, 1920.
1,393,587.
Patented Oct. 11, 1921.
5 SHEETS—SHEET 1.
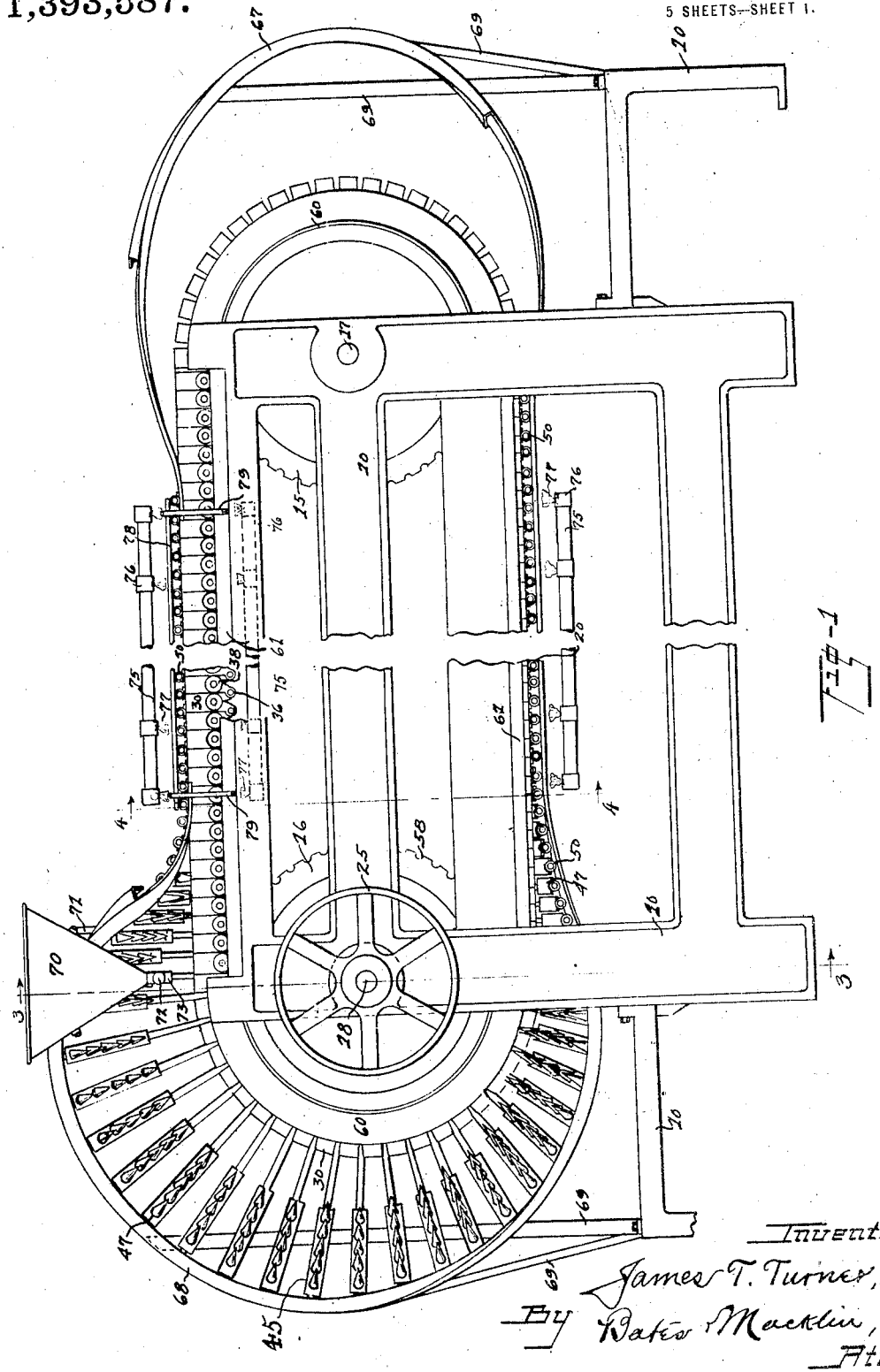

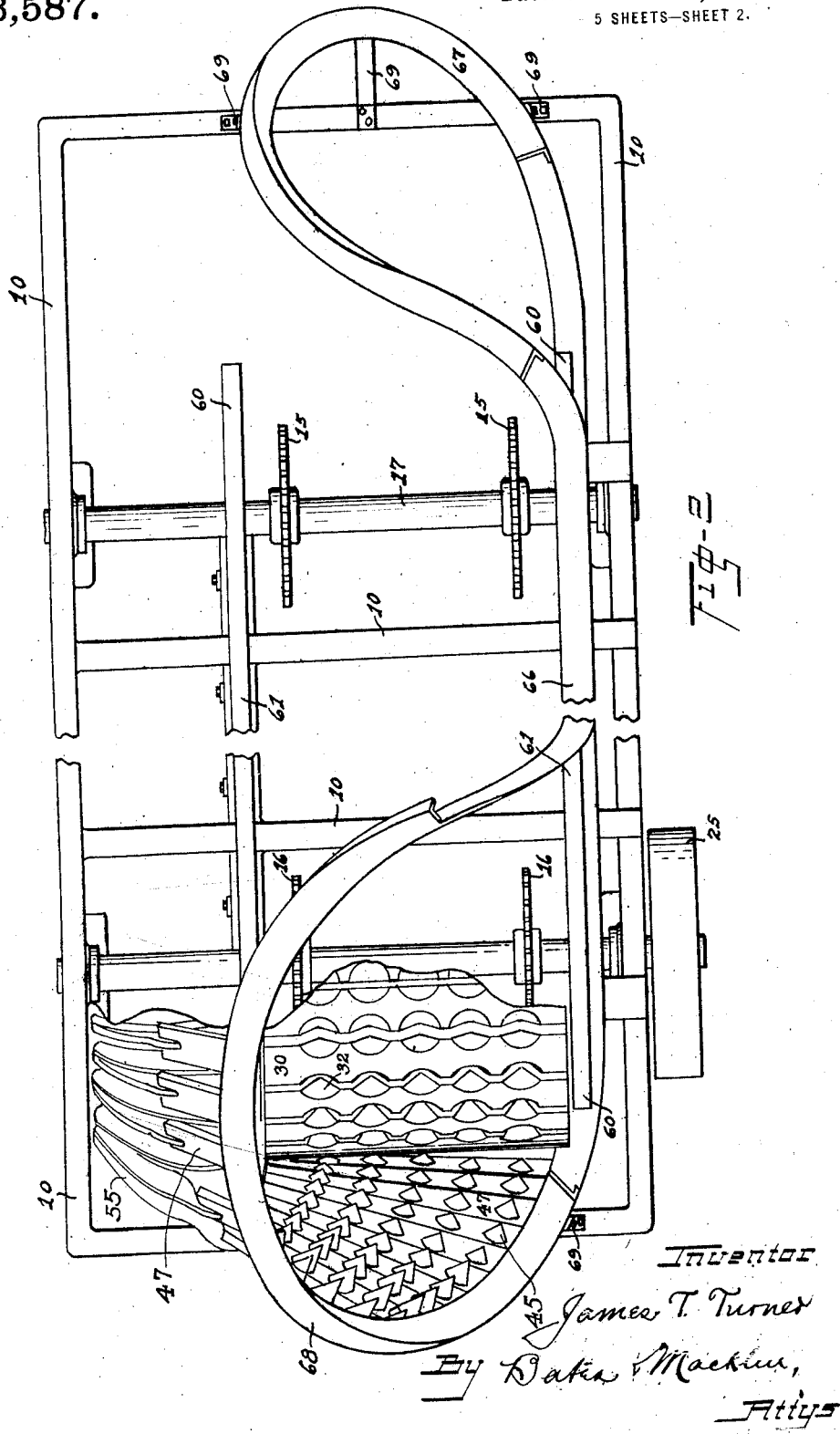

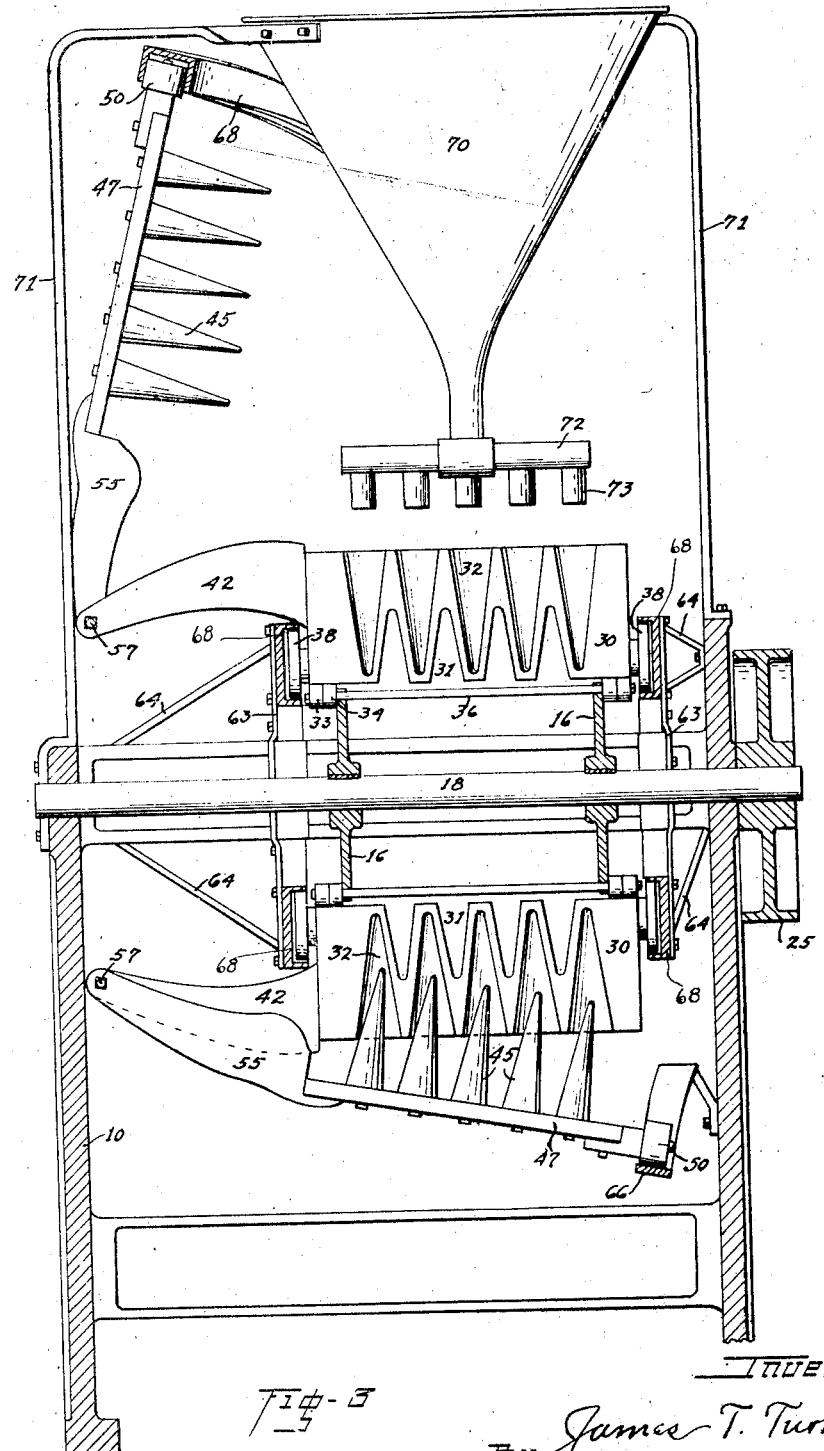

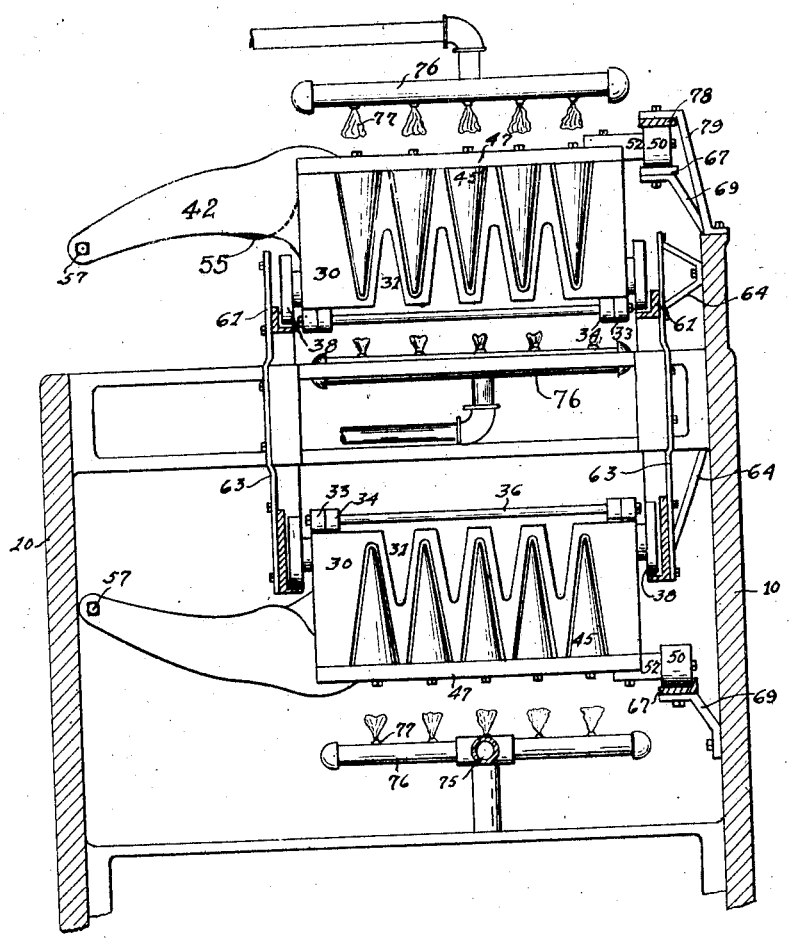

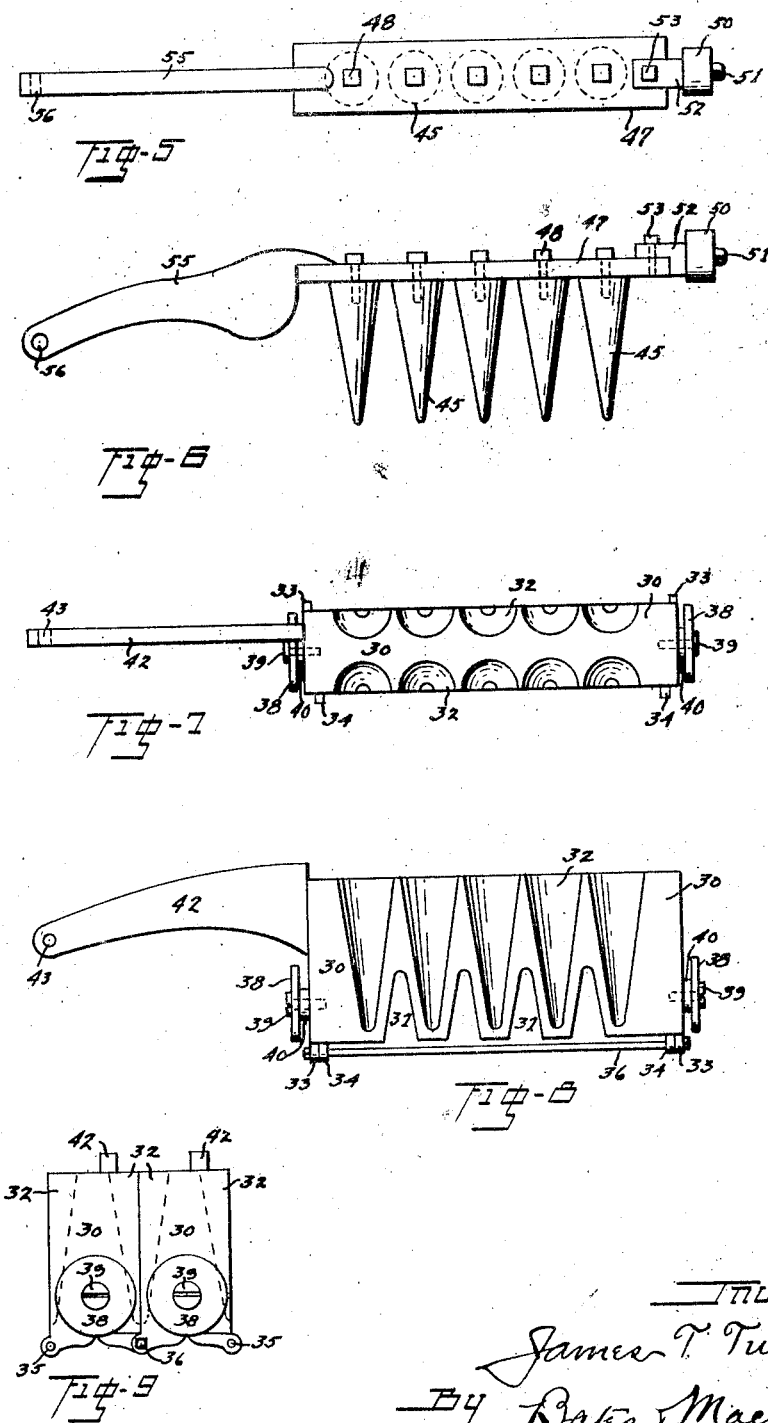

UNITED STATES PATENT OFFICE.

JAMES T. TURNER, OF ATLANTA, GEORGIA.

MACHINE FOR MAKING ICE-CREAM CONES.

1,393,587.

Specification of Letters Patent.  Patented Oct. 11, 1921.

Application filed February 28, 1920. Serial No. 362,069.

*To all whom it may concern:*

Be it known that I, JAMES T. TURNER, a citizen of the United States, residing at Atlanta, in the county of Fulton and State of Georgia, have invented a certain new and useful Improvement in Machines for Making Ice-Cream Cones, of which the following is a full, clear, and exact description, reference being had to the accompanying drawings.

An object of this invention is the provision of mechanism whereby ice cream cones may be rapidly formed, and baked, comprising a series of conical molds in an endless conveyer which may be moved continuously beneath a dough or batter hopper and through suitable baking heat to a discharge point. A more specific object is the arrangement of conical female molds or dies constituting links in an endless conveyer, with male dies pivoted to successive links and adapted to shape the batter in the female dies before and during the baking process, and be moved outwardly therefrom at suitable points in the cycle to permit the baked cones to be discharged and fresh batter inserted. Another object is the arrangement of the female dies whereby they may expand to facilitate the discharge of the cones therefrom at the proper time.

Other features include the construction of the molds whereby heat may be applied uniformly and locally to the cones during the process of baking, and the provision of means whereby the molds may be kept heated between the points of cone discharge and subsequent recharging.

Further features and objects of the invention will become more apparent as the description proceeds, and the essential characteristics are summarized in the claims.

In the accompanying drawings which illustrate a preferred embodiment of my invention, Figure 1 is a side elevation and Fig. 2 a plan of the machine with molds in the right hand portion omitted for simplicity of illustration; Figs. 3 and 4 are vertical sections on corresponding lines of Fig. 1; Figs. 5 and 6 are a plan and an elevation, respectively, of the male die; Figs. 7 and 8 are a plan and an elevation respectively of the female die; and Fig. 9 is an end view of two adjacent female dies.

In the drawings, the numeral 10 designates a frame, of any suitable length depending upon the desired capacity of the machine. Adjacent to the ends of the frame 10 pairs of sprocket wheels 15 and 16 are provided on transverse shafts 17 and 18, respectively mounted in bearings in the sides of the frame. Around the sprocket wheels is carried an endless belt or conveyer 20 having links each comprising a plurality of conical mold members. The conveyer may be advanced by the rotation of the shaft 18 as by the application of power to a suitable pulley wheel 25 secured to an end of the shaft projecting outside the frame 10.

Each link of the conveyer 20 is preferably constructed as illustrated in Figs. 7 and 8. As there shown, substantially rectangular blocks 30 are provided at opposite sides with semi-conical recesses 32 extending from the top of the block, nearly, but not quite to the bottom. The number of such recesses illustrated in each side of the block is five but it will be understood the length of the block and the number and dimensions of the recesses may be varied as occasion may demand. The blocks 30 are preferably recessed around the lower portions of the walls of the cavities 32 as illustrated at 31 to permit more thorough application of heat to the dough being baked therein.

The base of each block is shown provided with lugs 33 on one side at the ends and lugs 34 on the opposite side spaced inwardly slightly from the ends, the lugs being provided with alined horizontal openings 35 whereby when the blocks 30 are placed together side by side as illustrated in Figs. 8 and 9, the pair of lugs 33 of one block embraces the pair of lugs 34 of the adjacent block with their openings in registry and adapted to receive a rod or bolt 36 constituting a connecting pivot. Each block 30 is shown provided with a roller 38 at each end loosely mounted on a cap screw 39 spaced from the block by a washer 40. At one end of each block 30 is also secured an arm 42 projecting longitudinally and having an opening 43 in the outer end.

The semi-conical recesses 32 are similarly positioned in the several blocks or dies 30 so that when the dies are pivotally connected by means of the rods 36, the recesses 32 in each side of one block may coöperate with the corresponding recesses in the adjacent block to form conical recesses, thus constituting a chain of female mold members.

As illustrated in Figs. 5 and 6, a corresponding male die may be provided by securing conical members 45 to the underside of a substantially rectangular block 47. These projections 45 are slightly smaller in all dimensions than the conical cavities formed by adjacent recesses 32. As shown cap screws 48 are employed passing through the block 47 into the bases of the conical members 45, the number and spacing of which corresponds to that of the recesses 32 of the female dies. Each block 47 is shown provided at one end with a roller which may be loosely mounted on a cap screw 51 in the end of a lug 52 secured as by a screw 53 to the block. At the other end of the block is an arm 55 having an opening 56 in the outer end.

As shown in Figs. 3 and 4, the male die blocks are adapted to be pivoted to the female die blocks by bolts or screws 57 passed through the openings 43 and 56 in the ends of the die arms. The arm 42 of the die 30 is preferably located at one side so that when the arm 55 on the die 47, which is centrally positioned, is secured thereto, the projections 45 may be swung accurately centered into and out of engagement with the cavities 32.

The female mold members 30 are hinged together by the rods 36 as described, to form an endless chain or conveyer which is passed around the sprocket wheels 15 and 16 with the rods 36 engaging the tooth depressions 58, and the rollers 38 at each end of each die 30 traveling in a continuous trackway. This track comprises curved channel beams 60 at the ends of the machine around the sprockets and straight flanged runways 61 along the horizontal reaches between the ends, and secured to the frame 10 by suitable plates 63 and bracing stays 64.

The rollers 50 at the ends of the male dies 47 travel over a flat runway 66, parallel to the track portion 61 between the ends of the machine and so positioned relative thereto that the projections 45 occupy the recesses 32 though spaced from the wall thereof at all points. The runway merges into the channel runways 67 and 68 respectively at the ends. These runways 67 and 68 are warped or contorted as shown most clearly in Fig. 2 around the ends of the machine to cause the male dies traveling thereon to open outwardly on their hinges 57 and away from the female dies 30 while the latter are traveling around the sprocket wheels 15 and 16. The trackways 66, 67 and 68 may be supported on the frame 10 as by braces 69.

Above the conveyer 20 near one end of the machine a dough hopper 70 is mounted as by brackets 71 on the frame 10. As shown this hopper comprises a funnel having a transverse tube 72 at its lower end provided with a plurality of discharge spouts or nozzles 73, there being one for each of the cavities 32 in the female dies.

Between the hopper 70 and the other end of the machine, heating means extends longitudinally adjacent to the upper reach of the conveyer 20. As shown this comprises gas burners above and below the path of travel, namely gas pipes 75, having spaced thereon, at suitable intervals, transverse tubes 76 each being preferably provided with a jet 77 for each longitudinal row of cone molds in the conveyer. A bar 78 is provided above the track runway 66 and spaced therefrom by braces 79 to hold the male dies 47, by engagement with the rollers 50, in closed position in the female molds 32 while passing through the heating zone against the tendency of the steam, possibly generated in the molds, to open them. A similar series of heating jets may be provided along the lower reach of the conveyer to prevent the molds becoming cooled before being refilled. It may also be found advisable for the purpose of conserving heat, to wall around the machine, except at the points for spraying the molds and for extracting the cones, to form an oven.

In operation the endless mold conveyer 20 is moved by rotation of the sprocket wheel 16 by means of the pulley 25. At the end of the machine carrying the hopper 70, the runway 68, by reason of its warped arrangement, causes the male dies 47 to be opened outwardly and separated from the female dies 30 to which they are pivoted, and in this position oil or grease may be applied to them in the form of a spray. Dough or batter from the hopper 70 may be continuously discharged by gravity through the discharge spouts 73 into the open conical cavities 32, as the molds pass in succession beneath the hopper along the trackways 61. The small amount of dough falling on the tops of the female dies between the cavities assists in forming a close joint with the male dies 47, and also to some extent assists in the removal of the cones after they are baked. After the batter has entered the dies 30 the dies 47 are caused by the combined influence of gravity and the conformation of the runways 68 and 66 to close downwardly with the projections 45 entering the cavities 32 and forcing the batter therein upwardly into the space between the walls of the dies and shaping it in the form of the finished cone. The filled and closed molds then pass through the heating zone where the gas jets 77 playing steadily and directly on the outer walls of the molds quickly bake the dough into hollow cones constituting the well known ice cream containers.

After emerging from the baking zone, the warped runway 67 causes the male dies 47 to swing outwardly and away from the female mold members containing the baked cones.

As the conveyer links 30 constituting the female dies pass around the sprocket wheel 15, they will necessarily open or gap at their top or outer portions causing the cavities 32 to become enlarged and permitting the baked cones therein to drop out or be removed readily.

From the foregoing it will be apparent that I have provided a machine that is very simple in construction and operation, and that will function efficiently and rapidly in the formation, baking and discharge of cones.

I claim:

1. In a device of the character described, a conveyer and means for moving the same, said conveyer being composed of links pivoted together, said links having open-sided recesses in their sides, means for closing and opening such recesses and male members coacting with the recesses when closed.

2. In a device of the character described, a conveyer and means for moving the same, said conveyer being composed of links pivoted together, said links comprising blocks having complementary recesses in their adjacent sides, means for moving said links on their pivots to open and close said recesses and male members coacting with the recesses when closed.

3. In a device of the character described, a conveyer and means for moving the same, said conveyer being composed of links pivoted together, said links having open-sided recesses in their sides, means for closing the sides of such recesses and projections movably carried by the conveyer and adapted to occupy such closed recesses.

4. In a device of the character described, female mold members each comprising a block having a recess in each side thereof, and means for pivoting a plurality of such blocks together side by side, with each pair of adjacent recesses merging into a single cavity, and a male mold member adapted to coact with recesses in two adjacent female mold members.

5. In a device of the character described, female mold members each comprising a block having a recess in each side thereof, means for pivoting a plurality of such blocks together side by side, with each pair of adjacent recesses merging into a single cavity, and a male mold member pivoted to a female block and adapted to coact with said cavity.

6. In combination, a continuous trackway, a conveyer adapted to occupy and traverse said trackway, said conveyer comprising a series of links pivoted together, each link having complementary dough receiving recesses therein, and means for causing said links to gap and said recesses to expand at certain stages in the cycle of movement of the conveyer, and series of male members to occupy the recesses.

7. In combination, a conveyer comprising a series of links pivoted together, each link having dough receiving semi-conical and complementary recesses therein, and a curved trackway for causing said links to gap and said recesses to thereby separate at certain stages in the cycle of movement of the conveyer, a series of male members adapted to occupy the cavities provided by the links, and a controlling trackway for the male members.

8. In combination, a continuous trackway, an endless conveyer adapted to occupy and traverse said trackway, said conveyer comprising a series of links pivoted together, each link having opensided complementary dough receiving recesses therein, said complementary recesses in successive links forming unitary cavities when united, a trackway, members on said links running on the trackway to cause said links to gap and said recesses to therefore separate at certain stages in the cycle of movement of the conveyer, a series of male members pivoted to said links and adapted to occupy the cavities, and a controlling trackway for moving and positioning the male members.

9. In combination, an endless trackway, an endless conveyer adapted to occupy and traverse said trackway, said conveyer comprising a series of blocks pivoted together side by side, each block having uniformly positioned in each side a series of open-sided recesses, and a series of members pivoted to successive blocks, each member having a series of projections adapted to occupy the cavities provided by adjacent recesses.

10. In combination, a continuous trackway, a conveyer mounted to traverse the same, said conveyer comprising a plurality of pivoted link molds, complementary batter receiving cavities in adjacent links, male dies having projections adapted to occupy the cavities but spaced from the walls thereof, one of said dies being hinged to each link, and means for continuously moving the link molds beneath a charging hopper.

11. In combination, a plurality of recessed blocks pivoted together side by side with the recesses in adjacent blocks adjoining to form unitary cavities, an arm secured to each block, a second series of blocks, each having an arm pivoted to one of said first mentioned arms, and having projections adapted to occupy said cavities.

12. In combination, a plurality of blocks pivoted together side by side, a plurality of recesses in each side of each of said blocks, the recesses in one block complementing the recesses in the adjacent block to form symmetrical cavities, an arm secured to each block, a second series of blocks, each having an arm pivoted to one of said first mentioned arms, and having projections adapted to occupy said cavities though being constantly maintained out of engagement with the walls thereof.

13. In combination, a series of links pivoted together in the form of an endless chain and adapted to be driven continuously in such form, each link comprising a block having a plurality of mold cavities therein, a dough hopper, members having projections adapted to be inserted in said cavities, a baking heat zone beyond said hopper, means for successively driving said link molds beneath said hopper and through said baking heat, and means whereby the walls of said cavities gap to cause said cavities to expand while passing around the chain loops.

14. In combination, a series of links pivoted together in the form of an endless chain and adapted to be driven continuously in such form, each link comprising a block having a plurality of mold cavities therein, a constantly discharging fixed dough hopper, male members adapted to project into the dough in said cavities, a baking heat zone beyond said hopper, means for successively driving said link molds beneath said hopper and through said baking heat, and means for moving the male members away from the links before they reach the hopper and returning them after they have passed the hopper and after reaching the heat zone.

15. In combination, a series of links pivoted together in the form of an endless chain and adapted to be driven continuously in such form, each link comprising a block having a plurality of mold cavities therein, a dough hopper, a baking heat zone beyond said hopper, means for successively driving said link molds beneath said hopper and through said baking heat, male mold members adapted to occupy the batter-laden cavities, and means for moving the male mold members toward the links between the loading and heating zone and away from the links after passing the heating zone.

16. In combination, a continuous trackway forming a loop about a pair of sprocket wheels, a series of links pivoted together and adapted to be driven over said sprocket wheels and trackway, each link comprising a block having a recess in each side thereof, the recesses in each two adjacent blocks adjoining to form half their number of mold cavities, a dough hopper, members having projections adapted to be inserted in said cavities, a zone of baking heat between said hopper and one of said sprocket wheels, means for successively driving said cavity-containing links beneath said hopper and through said zone, means whereby the walls of said cavities are closed together while said links pass through said baking zone, and means whereby said links gap to expand said cavities while passing around said sprocket wheels.

17. In combination, a continuous looping trackway, a pair of sprocket wheels, a series of links pivoted together and adapted to be driven over said sprocket wheels and trackway, each link comprising a block having a recess in each side thereof, the recesses in each two adjacent blocks adjoining to form half their number of mold cavities, a dough hopper, a zone of baking heat between said hopper and one of said sprocket wheels, means for successively driving said cavity-containing links beneath said hopper and through said zone, a continuous trackway, members carried by the links and engaging said trackway whereby the walls of said cavities are closed together while said links pass through said baking zone, means whereby said links gap to expand said cavities while passing around said sprocket wheels, male members hinged to said links and having projections adapted to coöperate with said cavities, and a continuous trackway for swinging the male members to and from the links and positioning them with reference thereto.

18. In a device of the character described, a series of split female mold members, a pair of parallel continuous tracks, one being adapted for each end of said members, male dies pivoted to said female mold members, means for separating said female mold members, a roller at the free end of each male die and a third track adapted to receive said rollers and periodically guide said male dies toward and away from said female mold members to permit charging the molds with dough and extracting the baked product therefrom.

19. In a device of the character described, a series of split female mold members pivoted together at their bases side by side, in the form of an endless chain, a pair of parallel continuous tracks, one being adapted for each end of said members, a dough discharging hopper, means for moving said chain of mold members beneath said hopper, a male die pivoted at one end to each of said female mold members, a guiding device at the other end of each male die, track adapted to receive said guiding device and periodically guide said male dies toward and away from said female mold members to permit charging the molds with dough and extracting the baked product therefrom.

20. In a device of the character described, a series of female mold members pivoted together at their bases side by side, in the form of an endless chain, a dough discharging hopper, means for moving said chain of mold members beneath said hopper, a male die pivoted at one end to each of said female mold members, a roller at the other end of each male die, track adapted to receive said rollers and periodically guide said male dies toward and away from said female mold members to permit charging the molds with dough and extracting the baked product therefrom, said female members simultaneously separating to aid in the discharge of the goods.

21. In combination, an endless conveyer comprising a series of blocks pivoted together side by side, the conveyer blocks comprising a plurality of mold cavities, a dough hopper having a plurality of discharge spouts, one for each cavity in each link, a plurality of baking jets, one for each cavity in each link, and means whereby said cavities expand while the links pass around the sprocket wheels, whereby the baked dough in said cavities may be easily removed and said empty molds readily sprayed.

22. In combination, a frame, transverse shafts adjacent to each end thereof, sprocket wheels on said shafts, means for rotating one of said shafts, an endless conveyer carried over said sprocket wheels, said conveyer comprising a series of blocks pivoted together side by side, said pivots engaging depressions in said sprocket wheels, the conveyer blocks comprising a plurality of mold cavities, a dough hopper having a plurality of discharge spouts, one for each cavity in each link, male members movable toward and from the links, a heater to which the links and male members are subjected, and means whereby said male members are held away and said cavities expand while the links pass around the sprocket wheels whereby the baked dough in said cavities may be easily removed and said empty molds readily sprayed.

23. In combination, a frame, transverse shafts adjacent to each end thereof, sprocket wheels on said shafts, means for rotating one of said shafts, an endless conveyer carried over said sprocket wheels, said conveyer comprising a series of blocks pivoted together side by side, the conveyer blocks comprising a plurality of mold cavities, a dough hopper having a plurality of discharge spouts, one for each cavity in each link, a plurality of baking jets, a male die pivoted at one end to each of said female mold members, a roller at the other end of each male die, track adapted to receive said rollers and periodically guide said male dies toward and away from said female mold members to permit charging the molds with dough and extracting the baked product therefrom, and means whereby said cavities expand while the links pass around the sprocket wheels whereby the baked dough in said cavities may be easily removed and said empty molds readily sprayed.

24. In combination, a frame, bearings adjacent to each end thereof, an endless conveyer carried over said bearings, said conveyer comprising a series of blocks, each containing a plurality of complementary mold cavities which coöperate with the cavities in the adjacent block and pivoted together side by side, a coacting member pivoted to each block and adapted to occupy the central portion of the mold cavities, a dough hopper having a plurality of discharge spouts, a plurality of baking jets, means whereby said coacting members are periodically separated from said cavities and said cavities are opened by relative rotation of said adjacent blocks while the links pass around the sprocket wheels, whereby the baked dough in said cavities may be easily removed and the empty molds readily sprayed.

25. In combination, a continuous trackway, a conveyer mounted to traverse the same, said conveyer comprising a plurality of pivoted link molds, batter receiving cavities in said links, male dies having projections adapted to occupy the cavities but spaced from the walls thereof, one of said dies being hinged to each link, and means for continuously moving the link molds beneath a charging hopper, a trackway for moving the male dies toward and from the female, a heating device, there being a stationary member continuously engaged by the male members while passing through the heating device, whereby the male members are prevented from being displaced by the expansion of the material being heated.

JAMES T. TURNER.

Witnesses:
HARVEY MARKELES,
MAX MARKELES.